United States Patent [19]

McGhee

[11] 4,046,296

[45] Sept. 6, 1977

[54] BELT HOLSTER PURSE ASSEMBLY

[76] Inventor: Anna McGhee, 2541 Oaklen Way, Forestville, Md. 20028

[21] Appl. No.: 711,160

[22] Filed: Aug. 3, 1976

[51] Int. Cl.² .............................................. A45C 1/04
[52] U.S. Cl. ................................... 224/26 D; 24/3 R; 24/223; 150/47
[58] Field of Search ............... 224/26 R, 26 K, 26 H, 224/26 J, 26 F, 26 D, 26 C, 26 B, 5 R, 5 C, 5 D, 5 H, 22, 23, 19, 2 B, 2 C, 2 D, 5 A, 5 L, 5 K, 3; 24/208, 3 F, 3 R, DIG. 17, 210, 216, 223, 222 SF, 224 PL; 150/47

[56] References Cited

U.S. PATENT DOCUMENTS

| | | | |
|---|---|---|---|
| 1,599,688 | 9/1926 | Sullivan | 224/26 K |
| 2,548,104 | 4/1951 | Frison | 24/216 X |
| 2,689,957 | 9/1954 | Fulton | 150/47 X |
| 3,542,263 | 11/1970 | Callahan | 224/26 D |
| 3,648,906 | 3/1972 | Ross | 224/26 D |

FOREIGN PATENT DOCUMENTS

| | | | |
|---|---|---|---|
| 1,064,447 | 9/1959 | Germany | 24/208 R |
| 13,094 | 6/1901 | United Kingdom | 224/22 |

Primary Examiner—Robert J. Spar
Assistant Examiner—Jerold M. Forsberg

[57] ABSTRACT

A belt holster purse includes an elongate belt element the ends of which are adapted to be releasably connected. At least one peripherally extending slot is formed in selected segments of the side wall of the belt element. At least one purse member is slideably mounted in selected ones of the belt slots. The purse member includes top, bottom, front and rear walls. The rear wall carries a stud member dimensioned to project through the slot and slide therein. A first fastening element is carried by the outer free end of the stud member. The top wall of the purse member has a free end which extends downwardly in overlying relation to at least the upper portion of the rear wall. A second fastening element cooperable with the fastening element on the stud member is carried by the depending section of the top wall and is thus adapted to simultaneously close the purse member and releasably lock the purse member on the belt element.

7 Claims, 5 Drawing Figures

U.S. Patent      Sept. 6, 1977      4,046,296
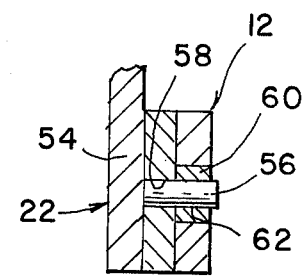
Fig. 2
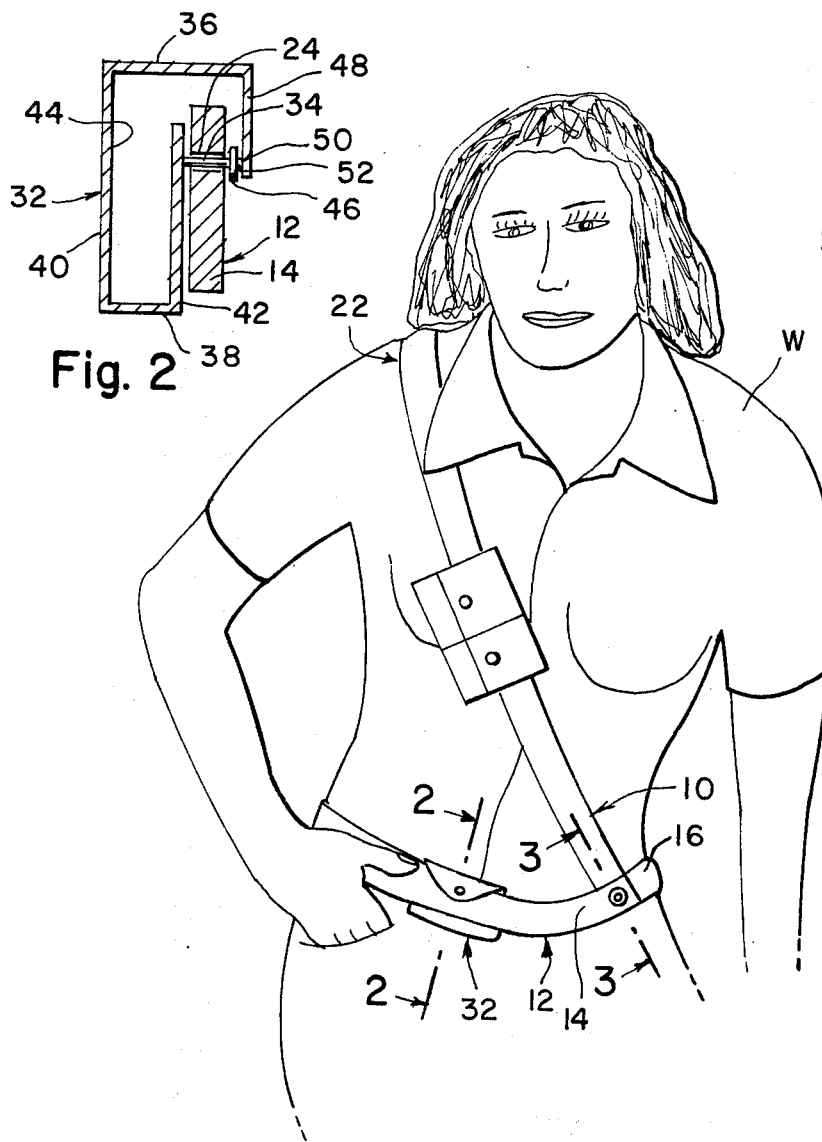
Fig. 3
Fig. 1
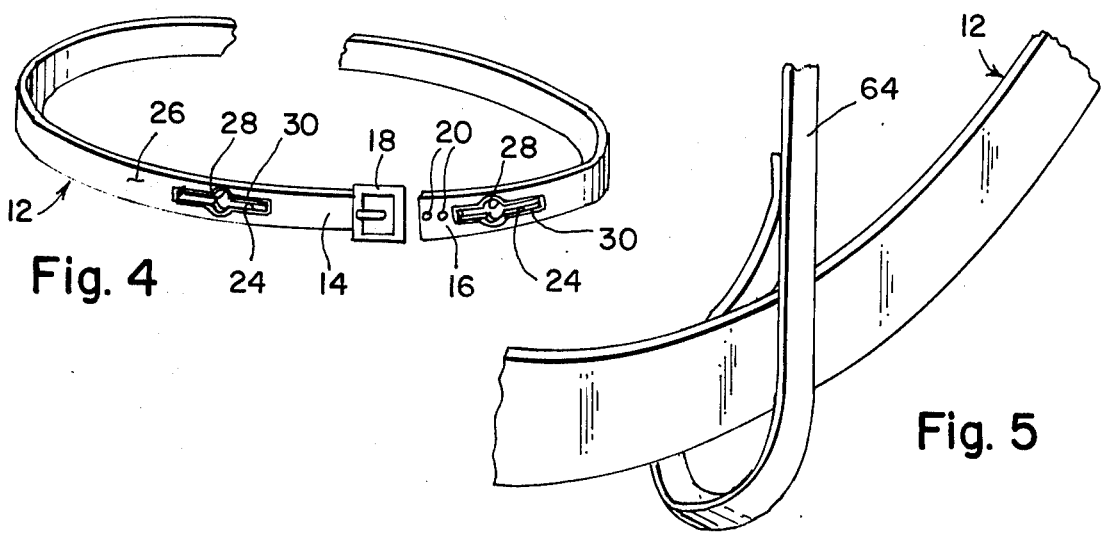
Fig. 4
Fig. 5

BELT HOLSTER PURSE ASSEMBLY

BACKGROUND OF THE INVENTION

The present invention relates to belt holster purses and more particularly to a belt and purse assembly which affords security against unauthorized access to the purse contents.

Pocket and purse attachments for belts have been known heretofore. Certain of such prior articles have sought to provide protection against inadvertant opening of the pocket covering flap and loss of the contents of the pocket and against theft. U.S. Pat. No. 3,542,263 issued Nov. 24, 1970 to George J. Callahan, for example, discloses a safety wallet or purse which is foldable so as to be wrapped about a belt. Snap fasteners are provided on the wallet or purse and, if desired, also on the belt to releasably lock the wallet or purse to the belt. Such prior assemblies, however, are designed so as to expose the fastening elements and thereby make it possible for someone to grasp the purse and separate it from the belt. Also, no provision was made for positioning the purse at a selected peripheral location on the belt. Although some peripheral movement of the purse along the belt was possible such movement was generally only that which resulted from accidental displacement of the purse and such movement usually resulted in udesirably wear of both the purse and belt.

SUMMARY OF THE INVENTION

It is one object of the invention to provide a belt holster purse by means of which a purse is releasably mounted on the belt in a manner designed to frustrate attempts at theft.

It is another object of the invention to provide a belt holster purse construction whereby the purse can be displaced peripherally to a convenient and comfortable position along the periphery of the belt.

It is yet another object of the invention to provide a belt holster purse construction which includes a shoulder strap arrangement affording means for carrying additional articles.

Other objects and advantages of the invention will become readily apparent from the following description of the invention.

According to the present invention there is provided a belt holster purse comprising in combination: an elongated belt element having end portions adapted to be releasably connected; at least one peripherally extending slot formed in selected segments of the side wall of the belt element; and at least one purse member slideably mounted in selected ones of the slots, each purse member including top, bottom, front and rear walls, a stud member being carried by the rear wall adapted to project through the slot and slide peripherally therein, a first fastening element being provided on the outer free end of the stud member, the top wall of the purse member having a free end extending downwardly in overlying relation to at least the upper portion of the rear wall and being provided with a second fastening element cooperable with the first fastening element for simultaneously closing the purse member and releasably locking same to the belt element.

BRIEF DESCRIPTION OF THE DRAWINGS

In order that the invention may be more fully comprehended it will now be described, by way of example, with reference to the accompanying drawings in which:

FIG. 1 is a front view of a woman wearing the belt holster purse of the invention;

FIG. 2 is a sectional view of the purse mounted on the belt as shown in FIG. 1 taken along line 2—2 thereof;

FIG. 3 is a sectional view of the interconnection between the belt and one end of the shoulder strap as depicted in FIG. 1 and taken along line 3—3 thereof;

FIG. 4 is a fragmentary view of the belt showing the slot formation therein; and FIG. 5 is a fragmentary view of the interconnection between the belt and shoulder strap at the rear of the person wearing the device.

DETAILED DESCRIPTION OF THE INVENTION

Referring to the drawings there is shown in FIG. 1 a woman W wearing the belt holser purse 10 of the invention. As can be seen from FIG. 1, the belt holster purse assembly comprises an elongated belt element 12 having end portions 14, 16 adapted to be releasably connected. Such end portions may be provided with a cooperable buckle element 18 and apertures 20 as shown in FIG. 4 or, alternatively, the construction shown in FIG. 5 may be utilized in conjunction with a shoulder strap 22.

As shown most clearly in FIG. 4, the belt element has at least one peripherally extending slot 24 formed therein in the side wall 26. In its preferred form each of such slots is provided with at least one enlarged opening 28 for a purpose to be explained. The edge defined by the slot and the enlarged openings is desirably provided with a reinforcing member 30 of relatively stiff material such as metal or a rigid synthetic plastics material. As will be described hereinafter the purpose of the reinforcing member is to impart sufficient stiffness to the side wall of the belt to enable the retention of the purse member 32 on the belt by means of a stud member 34 thereon except when the stud member is brought into alignment with one of the enlarged openings 28.

At least one purse member 32 is slideably mounted within selected slots of the belt element so as to be capable of limited peripheral movement within the confines of such slot. Each such purse member includes top 36, bottom 38, front 40 and rear 42 walls. Within these walls there is defined a pocket or chamber 44 which may be adapted to contain articles of make-up or cosmetics or money. Where desired, the chamber 44 may be partitioned into two or more compartments.

A stud member 34 is carried by the rear wall of the purse member and is adapted to project through the slot selected for the mounting of the purse member. An enlarged boss 46 is desirably formed on the stud member in spaced relation to the rear wall 42. The boss is given a dimension such that it may be drawn through any selected enlarged opening 28 for the mounting of the purse member on the belt or for the removal of the purse member therefrom. However, when the stud member is not in alignment with one of the enlarged openings 28 the boss is of sufficiently large dimension that it cannot be drawn through the slot. This feature is of importance because it prevents the theft of the purse member since one cannot visually ascertain from the outside of the belt the position of the enlarged openings and, therefore, the alignment required to withdraw the stud member from the slot. It is not even possible to ascertain the nature of this interlock arrangement when the purse member is mounted in the slot.

Referring to FIG. 2, it will be observed that the top wall 36 of the purse member terminates in a depending portion 48 which overlies at least the upper portion of rear wall 42. Fastening means are provided on stud member 34 and on depending portion 48 of the top wall which are cooperable so as to effect a simultaneous closing of the purse and the releasable locking of the purse member to the belt element. The fastening means may comprise male 50 and female 52 snap fastening elements.

If so desired a shoulder strap assembly 22 may be incorporated with the belt element in order to provide additional surface for the attachment of articles supplementing the purse and other articles carried in the slots of the belt element. The shoulder strap assembly comprises an elongated strap element 54 adapted at the ends thereof to be connected to peripherally spaced locations of the belt element. Thus, as shown in FIG. 3, one end of the strap element may be provided with an outwardly projecting stud member 56. An aperture 58 is formed in one end portion of the belt element and the other end portion of the belt element is given one of a pair of fastening elements 60, 62 which are cooperable to simultaneously detachably connect the end of the shoulder strap and both ends of the belt element. The other of the pair of fastening elements is carried by the outer free end of stud member 56 and is insertable through aperture 58 for connection with the other of the fastening elements. The fastening elements may comprise male and female snap fastening elements as discussed previously in connection with the mounting of the purse on the belt. It will be appreciated that this is a desirable arrangement for interconnection of the belt and strap elements since a single step is required to interconnect the end portions of the belt and one end of the strap element. In FIG. 5 there is shown one arrangement by means of which the other end of the strap element may be connected to the belt element. As depicted, the other end of the strap element is simply formed in a closed loop 64 dimensioned to enclose the belt element so as to be positionable at a location thereon which will afford maximum comfort to the wearer.

I claim:

1. A belt holster purse comprising in combination:
an elongated belt element having end portions adapted to be releasably connected;
at least one longitudinally extending reinforced slot formed in said belt element;
and at least one purse member slideably mounted in selected ones of said slots, each said purse member including top, bottom, front and rear walls, a stud member being carried by said rear wall adapted to project through said slot and slidable in said slot a first fastening element being provided on the outer free end of said stud member, the top wall of said purse member having a free end extending downwardly in overlying relation to at least the upper portion of said rear wall and being provided with a second fastening element cooperable with said first fastening element for simultaneously closing said purse member and releasably locking same to said belt element, said free end concealing said slot when said fastening elements are engaged.

2. A belt holster purse according to claim 1, wherein said first and second fastening elements comprise male and female snap fastening elements.

3. A belt holster purse according to claim 1, wherein a shoulder strap is secured to said belt element at a pair of peripherally spaced locations thereof.

4. A belt holster purse according to claim 3, wherein one end of said shoulder strap is detachably secured to said belt element at one of said locations, the said one location being the juncture at which the said end portions of the belt element are releasably connected whereby said one end of said shoulder strap and said end portions of said belt element are simultaneously detachably connected.

5. A belt holster purse according to claim 4, including an outwardly projecting stud member carried by said one end of said shoulder strap, an aperture formed in one of said end portions of said belt element, and first and second cooperable fastening elements carried by said stud element and by the other of said end portions of the belt element.

6. A belt holster purse according to claim 5, wherein said first and second fastening elements on said shoulder strap and other end portion of the belt element comprise male and female snap fastening elements.

7. A belt holster purse according to claim 1, wherein each of said slots is provided with at least one enlarged opening therein, said stud member having an enlarged boss formed thereon in spaced relation to the rear wall of said purse member and dimensioned to be inserted through any of said enlarged openings but incapable of being inserted through the remainder of said slot, the edges of said slots and enlarged openings therein being defined by a reinforcing member of relatively stiff material adapted to permit the withdrawal of said stud and boss only through the selected enlarged opening.

* * * * *